United States Patent
Rambo et al.

(10) Patent No.: US 12,421,895 B2
(45) Date of Patent: Sep. 23, 2025

(54) TURBINE ENGINE INCLUDING A CONDENSER SYSTEM

(71) Applicant: General Electric Company, Schenectady, NY (US)

(72) Inventors: Jeffrey D. Rambo, Mason, OH (US); Arthur W. Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/429,920

(22) Filed: Feb. 1, 2024

(65) Prior Publication Data
US 2025/0250932 A1    Aug. 7, 2025

(51) Int. Cl.
*F02C 6/18* (2006.01)
*F01K 23/10* (2006.01)
*F02C 6/00* (2006.01)

(52) U.S. Cl.
CPC .............. *F02C 6/18* (2013.01); *F01K 23/10* (2013.01); *F02C 6/00* (2013.01)

(58) Field of Classification Search
CPC .... F02C 3/30; F02C 3/305; F02C 6/00; F02C 6/18; F02C 7/00; F01K 23/10
See application file for complete search history.

(56) References Cited

U.S. PATENT DOCUMENTS 3,962,864 A * 6/1976 Williams .................. F02C 6/18
165/104.31
4,081,956 A    4/1978 Baker et al.
(Continued)

FOREIGN PATENT DOCUMENTS

FR    3127269 A1    3/2023
FR    3130896 A1    6/2023
(Continued)

OTHER PUBLICATIONS

Bjorn Fehrm, Leeham News and Analysis, "MTU gets support from Pratt & Whitney to develop the WET engine," published Nov. 29, 2022, available at https://leehamnews.com/2022/11/29/mtu-gets-support-from-pratt-whitney-to-develop-the-wet-engine/, as viewed on Jun. 30, 2023.
(Continued)

*Primary Examiner* — William H Rodriguez
(74) *Attorney, Agent, or Firm* — Venable LLP; Andrew W. Bradshaw; Michele V. Frank (57) ABSTRACT

A gas turbine engine for an aircraft includes a fan and a turbo-engine having a combustor that combusts compressed air and fuel to generate combustion gases and a power turbine coupled to a shaft for driving the fan. The gas turbine engine includes a direct contact condenser for condensing steam in a first flow into liquid water droplets and to generate a second flow including the liquid water droplets, a water tank for collecting the liquid water droplets of the second flow, and a water pump for introducing the liquid water droplets from the water tank into the direct contact condenser to act as condensation nuclei for the steam in the first flow. The first flow is an exhaust-vapor flow extracted from the combustion gases and the second flow is an exhaust-condensate flow from the direct contact condenser.

20 Claims, 6 Drawing Sheets

(56) References Cited

U.S. PATENT DOCUMENTS

| | | | | |
|---|---|---|---|---|
| 4,509,324 | A * | 4/1985 | Urbach | F02C 6/203 |
| | | | | 60/39.55 |
| 4,928,478 | A | 5/1990 | Maslak | |
| 5,896,740 | A | 4/1999 | Shouman | |
| 6,397,578 | B2 | 6/2002 | Tsukamoto et al. | |
| 8,567,177 | B1 | 10/2013 | Drori et al. | |
| 8,813,473 | B2 | 8/2014 | Fletcher et al. | |
| 11,371,395 | B2 | 6/2022 | Jain et al. | |
| 11,603,798 | B1 | 3/2023 | Terwilliger et al. | |
| 11,808,209 | B1 * | 11/2023 | Sobanski | F02C 6/18 |
| 11,988,137 | B1 * | 5/2024 | Snyder | F01K 23/10 |
| 12,006,866 | B2 * | 6/2024 | Terwilliger | B64D 33/08 |
| 12,031,485 | B1 * | 7/2024 | Terwilliger | F02C 7/185 |
| 12,065,964 | B1 * | 8/2024 | Terwilliger | F02C 7/141 |
| 12,072,100 | B1 * | 8/2024 | Naik | F23R 3/14 |
| 12,078,084 | B1 * | 9/2024 | Terwilliger | F02C 3/22 |
| 12,173,669 | B1 * | 12/2024 | Miller | F02C 3/305 |
| 12,215,634 | B1 * | 2/2025 | Sibbach | F01D 17/08 |
| 12,221,905 | B1 * | 2/2025 | Sibbach | F01K 23/10 |
| 2007/0017205 | A1 * | 1/2007 | Sasaki | F01D 25/32 |
| | | | | 60/39.53 |
| 2007/0271900 | A1 * | 11/2007 | Sasaki | F22B 1/1807 |
| | | | | 60/39.511 |
| 2009/0038287 | A1 * | 2/2009 | Sasaki | F02C 7/10 |
| | | | | 60/39.53 |
| 2010/0269482 | A1 * | 10/2010 | Hirota | F01D 25/32 |
| | | | | 60/39.53 |
| 2016/0281561 | A1 * | 9/2016 | Sato | F01N 3/0205 |
| 2021/0207500 | A1 * | 7/2021 | Klingels | F02C 3/305 |
| 2023/0258130 | A1 * | 8/2023 | Terwilliger | F02C 7/224 |
| | | | | 60/266 |
| 2023/0374938 | A1 * | 11/2023 | Staubach | F02C 3/22 |
| 2024/0011417 | A1 * | 1/2024 | Sibbach | F01D 21/12 |
| 2024/0026815 | A1 * | 1/2024 | Rocco | F02C 3/30 |
| 2024/0026817 | A1 * | 1/2024 | Rocco | F02C 3/30 |
| 2024/0102416 | A1 * | 3/2024 | Lei Ma | F01D 25/32 |
| 2024/0141837 | A1 * | 5/2024 | Chandler | F02K 3/06 |
| 2024/0254898 | A1 * | 8/2024 | Terwilliger | F02C 3/305 |
| 2024/0254913 | A1 * | 8/2024 | Staubach | F02C 6/003 |
| 2024/0254914 | A1 * | 8/2024 | Staubach | F02C 3/305 |
| 2024/0254915 | A1 * | 8/2024 | Snyder | F02C 3/30 |
| 2024/0254920 | A1 * | 8/2024 | Terwillger | F02C 7/16 |
| 2024/0271548 | A1 * | 8/2024 | Terwilliger | F01K 15/02 |
| 2024/0271549 | A1 * | 8/2024 | Terwilliger | F02C 3/22 |
| 2024/0271550 | A1 * | 8/2024 | Terwilliger | F01K 11/02 |
| 2025/0052189 | A1 * | 2/2025 | Sibbach | F02C 3/30 |
| 2025/0052190 | A1 * | 2/2025 | Sibbach | F02C 3/30 |
| 2025/0059911 | A1 * | 2/2025 | Sibbach | F02C 3/305 |
| 2025/0084789 | A1 * | 3/2025 | Sibbach | F02C 7/224 |
| 2025/0084793 | A1 * | 3/2025 | Sibbach | F02C 7/224 |

FOREIGN PATENT DOCUMENTS

| | | | |
|---|---|---|---|
| FR | 3130897 | A1 | 6/2023 |
| FR | 3133367 | A1 | 9/2023 |
| FR | 3133368 | A1 | 9/2023 |

OTHER PUBLICATIONS

MTU Aero Engines, "Water-enhanced turbofan," available at https://www.mtu.de/technologies/clean-air-engine/water-enhanced-turbofan/, as viewed on Jun. 30, 2023.

Isabel Henrich, MTU Aero Engines, "A brief guide: How the WET concept works," published Jun. 2022, available at https://aeroreport.de/en/good-to-know/a-brief-guide-how-the-wet-concept-works, as viewed on Jun. 30, 2023.

Slides from Sustainable Water-Injecting Turbofan Comprising Hybrid-Electrics (SWITCH) Introduction at the 2023 NPSS Annual Consortium Meeting, Mar. 10, 2023.

* cited by examiner

TURBINE ENGINE INCLUDING A CONDENSER SYSTEM

TECHNICAL FIELD

The present disclosure relates generally to a turbine engine including a condenser system.

BACKGROUND

Turbine engines generally include a fan and a core section arranged in flow communication with one another. A combustor is arranged in the core section to generate combustion gases for driving a turbine in the core section of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or a vehicle, and refer to the normal operational attitude of the turbine engine or the vehicle. For example, with regard to a high-bypass turbine engine, forward refers to a position closer to an engine inlet and aft refers to a position closer to an engine nozzle or an exhaust.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level"), or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides a steam system with a condenser system for recovering heat from an exhaust flow of a turbine engine. The condenser system of the present disclosure includes a condenser to convert water vapor from the exhaust flow to liquid for water harvesting in the steam system. The condenser system of the present disclosure allows for conversion of the water vapor while reducing fan duct blockage, drag, and weight associated with condensers provided within the bypass airflow passage between the outer casing and the nacelle.

Accordingly, the condenser system of the present disclosure provides a direct contact condenser having either, or both, of liquid drops sprayed into a vapor flow as condensation nuclei or a vapor jet submerged in a liquid pool. The condenser system of the present disclosure incorporates a gravity-based separator that doubles as a water tank or a water accumulator and incorporates a screen type separator to maximize liquid water recovery within the system.

Figure 1:
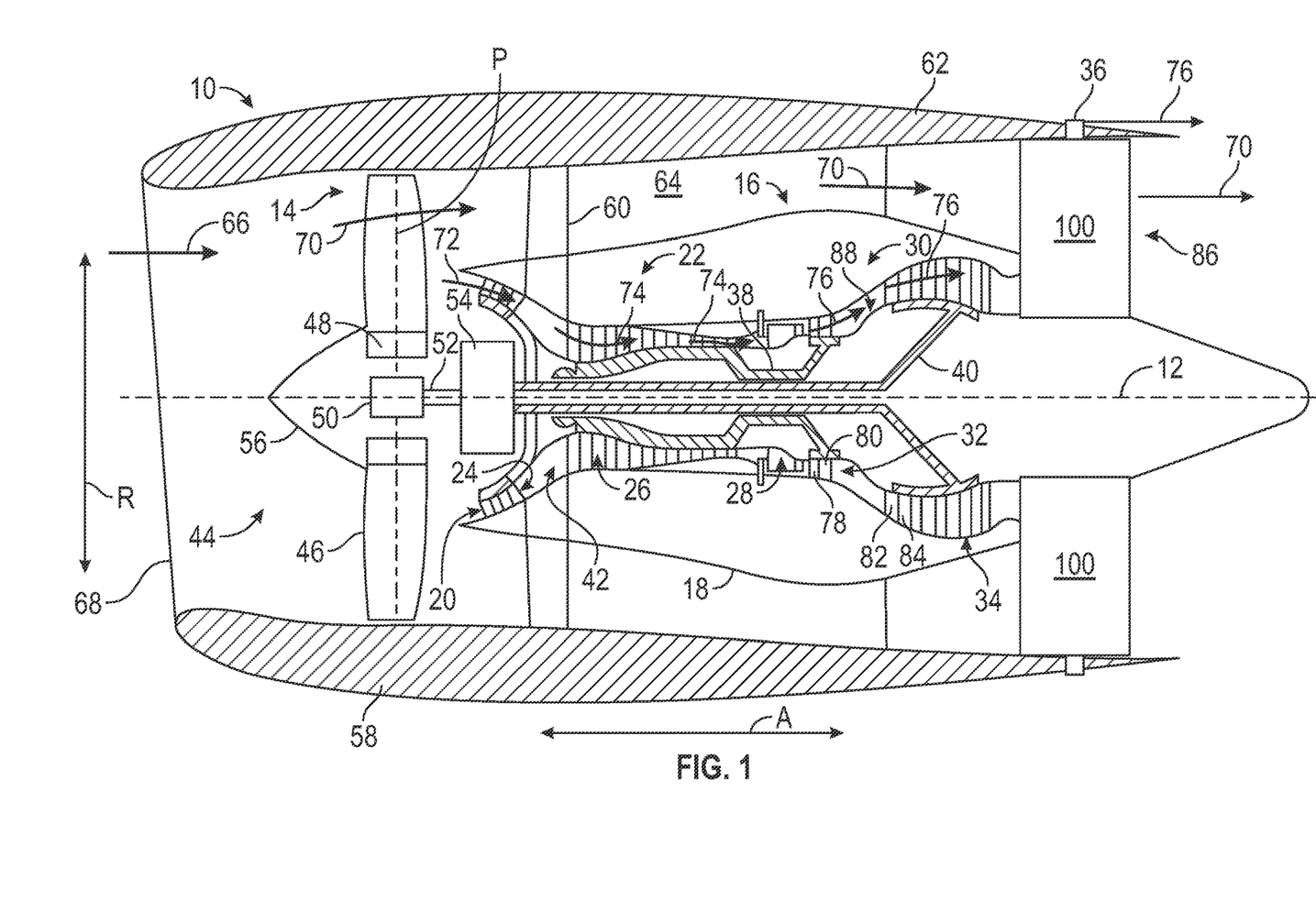
FIG. 1 is a schematic cross-sectional view of a turbine engine including a steam system, taken along a longitudinal centerline axis of the turbine engine, according to the present disclosure.

Referring now to the drawings, FIG. 1 is a schematic cross-sectional view of a turbine engine 10, taken along a longitudinal centerline axis 12 of the turbine engine 10, according to an embodiment of the present disclosure. The turbine engine 10 includes a steam system 100. As shown in FIG. 1, the turbine engine 10 defines an axial direction A (extending parallel to the longitudinal centerline axis 12 provided for reference) and a radial direction R that is normal to the axial direction A. In general, the turbine engine 10 includes a fan section 14 and a turbo-engine 16 disposed downstream from the fan section 14.

The turbo-engine 16 includes, in serial flow relationship, a compressor section 22, a combustor 28, and a turbine section 30. The turbo-engine 16 is substantially enclosed within an outer casing 18 that is substantially tubular and defines an annular inlet 20. As schematically shown in FIG. 1, the compressor section 22 includes a booster or a low pressure (LP) compressor 24 followed downstream by a high pressure (HP) compressor 26. The combustor 28 is downstream of the compressor section 22. The turbine section 30 is downstream of the combustor 28 and includes a high pressure (HP) turbine 32 followed downstream by a low pressure (LP) turbine 34, also referred to herein as a power turbine 34. The turbo-engine 16 further includes a core exhaust nozzle(s) section having one or more core exhaust nozzle(s) 36 that is downstream of the turbine section 30, a high pressure (HP) shaft 38 or a spool, and a low pressure (LP) shaft 40. The HP shaft 38 drivingly connects the HP turbine 32 to the HP compressor 26. The HP turbine 32 and the HP compressor 26 rotate in unison through the HP shaft 38. The LP shaft 40 drivingly connects the LP turbine 34 to the LP compressor 24. The LP turbine 34 and the LP compressor 24 rotate in unison through the LP shaft 40. The compressor section 22, the combustor 28, the turbine section 30, and the core exhaust nozzle(s) 36 together define a core air flow path 42.

For the embodiment depicted in FIG. 1, the fan section 14 includes a fan 44 (e.g., a variable pitch fan) having a plurality of fan blades 46 coupled to a disk 48 in a spaced apart manner. As depicted in FIG. 1, the fan blades 46 extend outwardly from the disk 48 generally along the radial direction R. In the case of a variable pitch fan, the plurality of fan blades 46 are rotatable relative to the disk 48 about a pitch axis P by virtue of the fan blades 46 being operatively coupled to an actuation member 50 configured to collectively vary the pitch of the fan blades 46 in unison. The fan blades 46, the disk 48, and the actuation member 50 are together rotatable about the longitudinal centerline axis 12 via a fan shaft 52 that is powered by the LP shaft 40 across a power gearbox, also referred to as a gearbox assembly 54. In this way, the fan 44 is drivingly coupled to, and powered by, the turbo-engine 16 and the turbine engine 10 is an indirect drive engine. The gearbox assembly 54 is shown schematically in FIG. 1. The gearbox assembly 54 is a reduction gearbox assembly for adjusting the rotational speed of the fan shaft 52 and, thus, the fan 44 relative to the LP shaft 40 when power is transferred from the LP shaft 40 to the fan shaft 52.

Referring still to the exemplary embodiment of FIG. 1, the disk 48 is covered by a rotatable fan hub 56 aerodynamically contoured to promote an airflow through the plurality of fan blades 46. In addition, the fan section 14 includes an annular fan casing or a nacelle 58 that circumferentially surrounds the fan 44 and at least a portion of the turbo-engine 16 by a plurality of outlet guide vanes 60 that are circumferentially spaced about the nacelle 58 and the turbo-engine 16. Moreover, a downstream section 62 of the nacelle 58 extends over an outer portion of the turbo-engine 16, and, with the outer casing 18, defines a bypass airflow passage 64 therebetween.

During operation of the turbine engine 10, a volume of air 66 enters the turbine engine 10 through an inlet 68 of the nacelle 58 or the fan section 14. As the volume of air 66 passes across the fan blades 46, a first portion of air 70, also referred to as bypass air 70, is directed or routed into the bypass airflow passage 64, and a second portion of air 72, also referred to as core air 72, is directed or is routed into the upstream section of the core air flow path 42 through the annular inlet 20 of the LP compressor 24. The ratio between the bypass air 70 and the core air 72 is commonly known as a bypass ratio. The pressure of the core air 72 is then increased, generating compressed air 74. The compressed air 74 is routed through the HP compressor 26 and into the combustor 28, wherein the compressed air 74 is mixed with fuel and ignited to generate combustion gases 76.

The combustion gases 76 are routed into the HP turbine 32 and expanded through the HP turbine 32 where a portion of thermal energy and kinetic energy from the combustion gases 76 is extracted via one or more stages of HP turbine stator vanes 78 and HP turbine rotor blades 80 that are coupled to the HP shaft 38. This causes the HP shaft 38 to rotate, thereby supporting operation of the HP compressor 26 (self-sustaining cycle). In this way, the combustion gases 76 do work on the HP turbine 32. The combustion gases 76 are then routed into the LP turbine 34 and expanded through the LP turbine 34. Here, a second portion of thermal energy and the kinetic energy is extracted from the combustion gases 76 via one or more stages of LP turbine stator vanes 82 and LP turbine rotor blades 84 that are coupled to the LP shaft 40. This causes the LP shaft 40 to rotate, thereby supporting operation of the LP compressor 24 (self-sustaining cycle) and rotation of the fan 44 via the gearbox assembly 54. In this way, the combustion gases 76 do work on the LP turbine 34.

The combustion gases 76 are subsequently routed through the core exhaust nozzle(s) 36 of the turbo-engine 16 to provide propulsive thrust. Simultaneously, the bypass air 70 is routed through the bypass airflow passage 64 before being exhausted from a fan nozzle exhaust 86 of the turbine engine 10, also providing propulsive thrust. The HP turbine 32, the LP turbine 34, and the core exhaust nozzle(s) 36 at least partially define a hot gas path 88 for routing the combustion gases 76 through the turbo-engine 16.

The turbine engine 10 includes a fuel system (not depicted) that provides a fuel flow to the combustor 28 to produce the combustion gases 76. The fuel system may include a fuel tank or a fuel supply for storing fuel therein, a fuel supply line, and a fuel injector. The fuel flow is provided from the fuel tank, along the fuel supply line to the fuel injector, which introduces the fuel flow into the combustor 28. The fuel system may include one or more flow control devices or valves along the fuel supply line for controlling an amount of the fuel provided to the combustor 28. The fuel injector (not shown) may be provided at a forward end of the combustor 28. Fuel provided along the fuel supply line through the fuel injector is provided at a forward end of the combustor 28 of the combustion section.

The turbine engine 10 includes the steam system 100 in fluid communication with the one or more core exhaust nozzle(s) 36 and the fan bypass nozzle 86. The steam system 100 extracts steam from the combustion gases 76 as the combustion gases 76 flow through the steam system 100, as detailed further below.

The turbine engine 10 depicted in FIG. 1 is by way of example only. In other exemplary embodiments, the turbine engine 10 may have any other suitable configuration. For example, in other exemplary embodiments, the fan 44 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
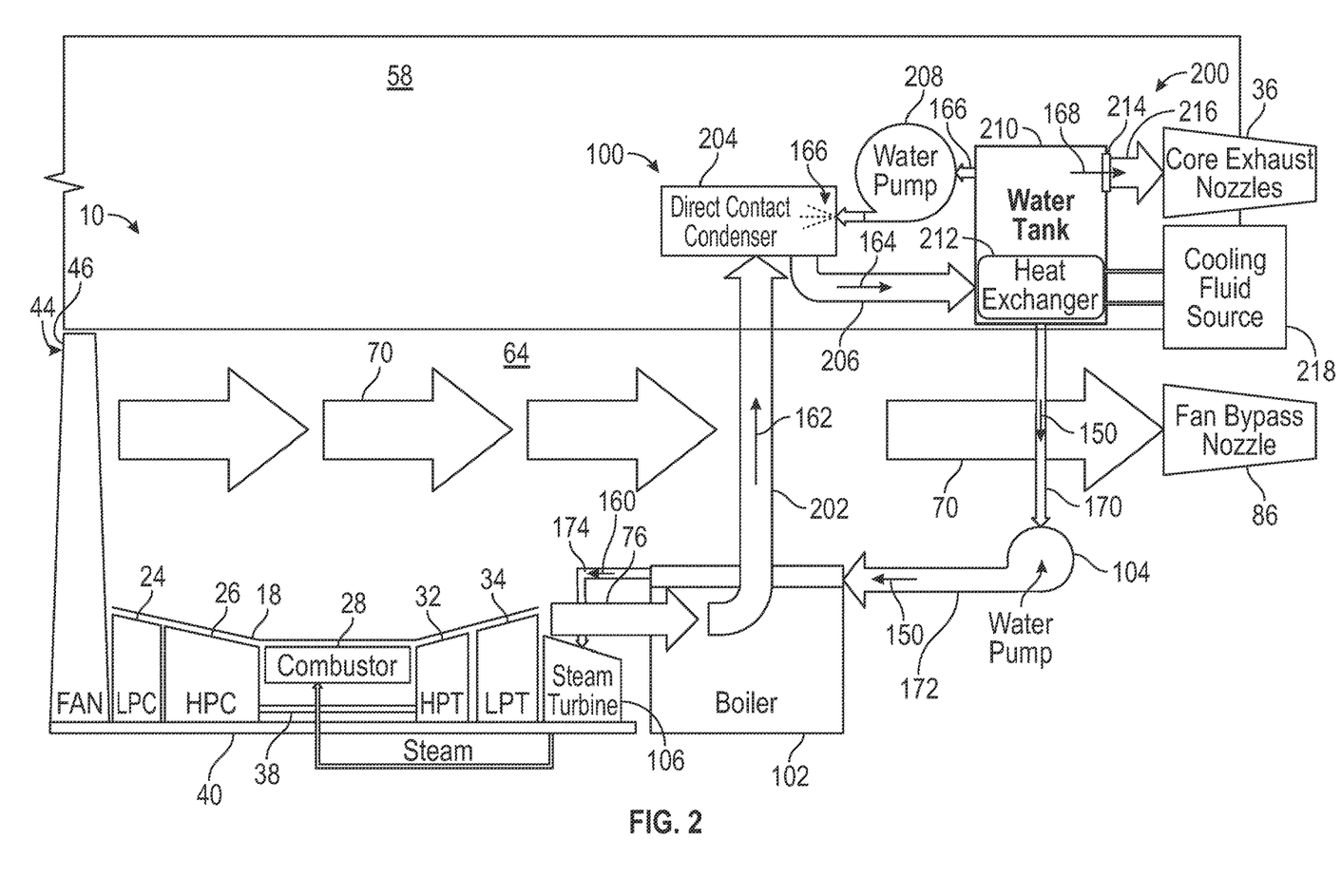
FIG. 2 is a schematic diagram of the turbine engine and the steam system of FIG. 1, according to the present disclosure.

FIG. 2 illustrates a schematic diagram of the turbine engine 10 and the steam system 100 of FIG. 1, according to the present disclosure. For clarity, the turbine engine 10 is shown schematically in FIG. 2 and some components are not shown in FIG. 2. The steam system 100 includes a boiler 102, a first water pump 104, a steam turbine 106, and a condenser system 200. The condenser system 200 includes an exhaust-vapor passage 202, a condenser 204, an exhaust-condensate passage 206 (also referred to herein as a first manifold or a first plenum), a second water pump 208, a water tank 210 (also referred to herein as a second manifold or a second plenum), a heat exchanger 212, a dryer 214, an exhaust passage 216 (also referred to herein as a third manifold or a third plenum), and a cooling fluid source 218. Certain portions of the condenser system 200 are located in the nacelle 58. Components of the condenser system 200 may be located at other locations within the turbine engine 10.

The boiler 102, also referred to herein as an evaporator, is a heat exchanger that vaporizes liquid water from a water source to generate steam or water vapor. The boiler 102 is a steam source. In particular, the boiler 102 is an exhaust gas-water heat exchanger. The boiler 102 is in fluid communication with the hot gas path 88 (FIG. 1) and is positioned downstream of the LP turbine 34. The boiler 102 is also in fluid communication with the first water pump 104. The boiler 102 can include any type of boiler or heat exchanger. As discussed in more detail to follow, the boiler 102 extracts heat from the combustion gases 76 and vaporizes liquid water (from the first water pump 104) into steam or water vapor as the liquid water (e.g., liquid water 150) and the combustion gases 76 flow through the boiler 102. The resulting exhaust-vapor flow is then provided to the condenser 204.

The first water pump 104 is in fluid communication with the water tank 210 and the boiler 102. The first water pump 104 may be any suitable pump, such as a centrifugal pump or a positive displacement pump. As described in more detail to follow, the water tank 210 operates as a liquid-gas separator to separate out liquid water from the cooled combustion gases 76 received from the condenser 204 (via the exhaust-condensate passage 206, FIG. 2). The first water pump 104 directs the separated liquid water from the water tank 210 through the boiler 102 where the liquid water is converted back to steam (e.g., steam 160). The steam is sent through the steam turbine 106 then injected into the core air flow path 42 (e.g., into the combustor 28, upstream of the combustor 28, or downstream of the combustor 28).

The exhaust-vapor passage 202 is in fluid communication with the boiler 102 and the condenser 204. The exhaust-vapor passage 202 conveys the combustion gases 76 as the mixture exits the boiler 102 to the condenser 204, as detailed further below. The exhaust-vapor passage 202 may include one or more passages. In some examples, such as in the condenser system described with respect to FIGS. 4 to 6, the exhaust-vapor passage 202 may be one or more struts.

The condenser 204 is a heat exchanger that further cools the combustion gases 76 (e.g., the air and vapor) from the exhaust-vapor passage 202 as the combustion gases 76 flow through the condenser 204, as detailed further below. The condenser 204 is in fluid communication with the boiler 102 via the exhaust-vapor passage 202. The condenser 204 is a direct contact condenser 204 for condensing the water content (from vapor to liquid form) in the exhaust (e.g., the combustion gases 76). A direct contact condenser transfers heat from a gas (in this case, the heat in the combustion gas 162 flowing through the exhaust-vapor passage 202, which combustion gas 162 originates from combustion gases 76) to a liquid. The liquid and the gas come into direct contact, which maximizes thermal efficiency. More specifically, a direct contact condenser injects a sub-cooled liquid into a vapor stream of the same substance (e.g., the sub-cooled liquid may be a liquid water, while the vapor stream may be steam as water vapor). The liquid droplet surface area of the sub-cooled liquid provides the required sub-cooled surface on which the vapor stream condenses. As used herein, the term "sub-cooled" means the liquid temperature is below the saturation temperature corresponding to the vapor pressure of gaseous flow.

In some examples, the direct contact condenser 204 includes a liquid (e.g., liquid water 166) sprayed into the flow of combustion gases 162 (e.g., by way of the second water pump 208 and/or by way of liquid spray nozzles 524 (FIG. 5)). The combustion gases 162 combine with the sprayed liquid to form a moist air stream with residual constituents (e.g., unreacted fuel, particulates, etc.). The sprayed liquid cools the combustion gases 162 within the moist air stream and enhances thermal transfer. The sprayed liquid (e.g., liquid water 166) may be injected into the direct contact condenser 204 as finely atomized droplets to act as condensation nuclei for the existing water vapor in the moist air stream through the direct contact condenser 204, which results in growing liquid water droplets. The direct contact condenser 204 also operates as a spray cooler to cool the combustion gases 162. In some examples, the direct contact condenser 204 may include a plurality of elongated fluid passages, such as the condensers 504 described with respect to FIGS. 4 to 6.

The exhaust-condensate passage 206 is in fluid communication with the condenser 204 and the water tank 210. The exhaust-condensate passage 206 conveys the further condensed combustion gases 76 from the condenser 204 to the water tank 210, as detailed further below. In some examples, the exhaust-condensate passage 206 is a plenum or a cavity.

The second water pump 208 is in fluid communication with the water tank 210 and with the condenser 204. The second water pump 208 may be any suitable pump, such as a centrifugal pump or a positive displacement pump. The second water pump 208 directs the separated liquid water from the water tank 210 back to the condenser 204 to assist in condensing the combustion gases 76 flowing through the condenser 204, as described further below.

In some examples, a second water pump 208 may be omitted. In such an example, a single water pump may perform the function of both the first water pump 104 and the second water pump 208. The single water pump may have flow splits to deliver a portion of the flow to the condenser 204 (e.g., in lieu of the second water pump 208) and a portion of the flow to the boiler 102 (e.g., in lieu of the first water pump 104). The first water pump 104 and the second water pump 208 may deliver the flow at a different pressure to the condenser 204 and the boiler 102, respectively, while the single water pump may deliver the liquid flow to the condenser 204 and the boiler 102 at the same pressure. Furthermore, the single water pump may be a single multistage pump at a location where the condenser flow is extracted at an intermediate stage and delivered to the condenser 204 at a pressure less than the pressure delivered to the boiler 102 thus receiving the fully pressurized liquid flow.

The water tank 210 is in fluid communication with the condenser 204 for receiving cooled exhaust (combustion gases 76) having condensed liquid water entrained therein. The water tank 210 operates as both an accumulator or a storage tank and as a liquid-gas separator, as detailed below. The water tank 210 is also in fluid communication with the exhaust-condensate passage 206, the one or more core exhaust nozzle(s) 36, the first water pump 104, and the second water pump 208.

The boiler 102 receives liquid water through passages 170, 172 from a water source, such as the water tank 210, to generate steam or water vapor for the steam turbine 106. The water tank 210 may be pre-filled or previously supplied with liquid water prior to operation of the engine or the water tank 210 may be filled by use of the condenser system 200 (e.g., filled by condensing liquid) or both. The water tank 210 is fluidly coupled to the passage 170 for providing liquid water 150 separated from the exhaust-condensate flow 164 to the water pump 104. The water pump 104 supplies the liquid water 150 through the passage 172 to the boiler 102. As discussed in more detail to follow, the boiler generates steam 160 from the liquid water 150 and provides the steam 160 to the steam turbine 106 through the passage 174.

The heat exchanger 212 is in fluid communication with the cooling fluid source 218 and the condenser 204. The cooling fluid of the cooling fluid source 218 may be, for example, but not limited to, a cryogenic fuel in thermal communication with the heat exchanger 212, or transfer fluid (e.g., supercritical fluid) of a thermal transport bus in thermal communication with a heat sink, such as a cryogenic fuel. The exhaust gas and the condensed water (e.g., an exhaust-condensate flow 164) may be cooled by the heat exchanger 212 prior to returning to water tank 210. Alternatively, or additionally, the liquid water from the direct contact condenser 204 is returned to the water tank 210 at an elevated temperature relative to the temperature at which the liquid water was pumped into the direct contact condenser 204. The heat exchanger 212 is in thermal communication with the water tank 210 to maintain the desired water temperature of the liquid water being supplied to the direct contact condenser 204 (e.g., the liquid water 166). In such an example, the condenser system 200 requires less energy to cool the liquid water only, and there is a propulsive benefit for maintaining exhaust gas at an elevated temperature.

The dryer 214 is in fluid communication with the water tank 210 and the core exhaust nozzle(s) 36. The dryer 214 removes any remaining water from the exhaust before the exhaust exits through the core exhaust nozzle(s) 36. Although the heat exchanger 212 and the dryer 214 are illustrated within the water tank 210, other locations are contemplated. The dryer 214 may be a mist pad or a wave plate separator that coalesces liquid droplets and drains the liquid droplets through gravity back to the liquid pool in the water tank 210.

The exhaust passage 216, also referred to herein as dried air exhaust duct, is in fluid communication with the core exhaust nozzle(s) 36 and the water tank 210. Air flowing through the exhaust passage 216 was previously dried with the dryer 214 such that air, with little or no entrained water, is exhausted through the core exhaust nozzle(s) 36.

In operation, the combustion gases 76 flow through the boiler 102, adding heat to the water 150 pumped (via pump 104) through passage 172 to vaporize the water 150 within the passage 172. The heated water/steam 160 then drives the steam turbine 106 and is injected into the combustor 28 to complete the cycle. The passage 202 (e.g., located within a strut) provides passage for combustion gases 162 and begins to cool the combustion gases using bypass air 70. The cooled combustion gases 162 are sent to the direct contact condenser 204 where heat in the combustion gases 162 is further removed by mixing the combustion gases 162 with pressurized liquid water droplets (e.g., water 166) sprayed into the gas stream by the pump 208. The resulting exhaust-condensate flow 164 is then sent to the water tank 210, and the fluid is passed through a heat exchanger 212 in thermal communication with a cooling fluid source 218. As mentioned, liquid water 166 from the second water pump 208 is injected into the condenser 204. The liquid water 166 entering the condenser 204 acts as condensation nuclei to further condense the combustion gases 162 in the condenser 204. The combustion gases, now condensed to an exhaust-condensate flow 164, flow through the exhaust-condensate passage 206 to the water tank 210. The bypass air 70 and the liquid water 166 cool and condense the water from the combustion gases 162 to generate the exhaust-condensate flow 164.

Liquid water is separated from the exhaust-condensate flow 164, collected at the bottom of the water tank 210 and may be supplied to the boiler 102 (via the first water pump 104 and passages 170, 172) or to the condenser 204 (via the second water pump 208) or both. The dehumidified combustion gases separate to the top of the water tank 210, as illustrated by an air flow or exhaust, and may be supplied to the core exhaust nozzle(s) 36. A dryer 214 may dry the dehumidified combustion gases 168, also referred to herein as exhaust 168, further such that the air flowing through the exhaust passage 216 to the core exhaust nozzle(s) 36 has minimal residual water content. Residual water still present in the exhaust 168 may be removed by the dryer 214 before being exhausted through the core exhaust nozzle(s) 36; and may provide additional thrust to the engine, as detailed above. In this manner, little or no water is present in the exhaust 168 flowing through the core exhaust nozzle(s) 36.

The water tank 210 separates the water from the exhaust of the exhaust-condensate flow 164 to generate separate flows of exhaust 168 and liquid water 150, 166. The water tank 210 may separate water from the combustion gases as a gravity separator. Although illustrated with different reference numerals, the liquid water 150 and the liquid water 166 are not separate water flows that are separated from the exhaust-condensate flow 164, but, rather, represent two separate flows from the same water that is separated from the exhaust-condensate flow 164. The boiler 102 and the condenser system 200 define a portion of the hot gas path 88 (FIG. 1) for routing the combustion gases 76, the combustion gases 162, also referred to as exhaust-vapor flow 162, the exhaust-condensate flow 164, and the exhaust 168 through the steam system 100 of the turbine engine 10.

As mentioned, the first water pump 104 pumps the liquid water 150 (e.g., in liquid form) through one or more water lines (e.g., passage 170 and passage 172) and the liquid water 150 flows through the boiler 102. As the liquid water 150 flows through the boiler 102, the combustion gases 76 flowing through the boiler 102 transfer heat into the liquid water 150 to vaporize the liquid water 150 and to generate the steam 160 (e.g., vapor). The steam turbine 106 includes one or more stages of rotating blades and stationary or stator blades. The steam 160, carried through passage 174 from the boiler 102 into the steam turbine 106, drives the steam turbine 106, thereby generating additional work on an output shaft coupled to the steam turbine 106.

As noted above, the turbo-engine 16 includes shafts coupling various rotating components of the turbo-engine 16 and other thrust producing components such as the fan 44. In the turbo-engine 16 shown in FIG. 1, these shafts include the HP shaft 38 and the LP shaft 40. The steam turbine 106 is coupled to one of the shafts of the turbo-engine 16, such as the HP shaft 38 or the LP shaft 40. In the illustrated embodiment, the steam turbine 106 is coupled to the LP shaft 40. As the steam 160 flows from the boiler 102 through the steam turbine 106, the kinetic energy of this gas is converted by the steam turbine 106 into mechanical shaft work in the LP shaft 40. The reduced temperature steam 160 exiting the steam turbine 106 is then injected into the core air flow path 42 (FIG. 1), such as into the combustor 28, upstream of the combustor 28, or downstream of the combustor 28. In this way, the steam system 100 extracts additional work from the heat in the exhaust gas that would otherwise be wasted. The steam 160 may also reduce hot spots in the combustor 28 from the combustion of the fuel (e.g., in particular, when the fuel is supercritical hydrogen or gaseous hydrogen).

Figure 3:
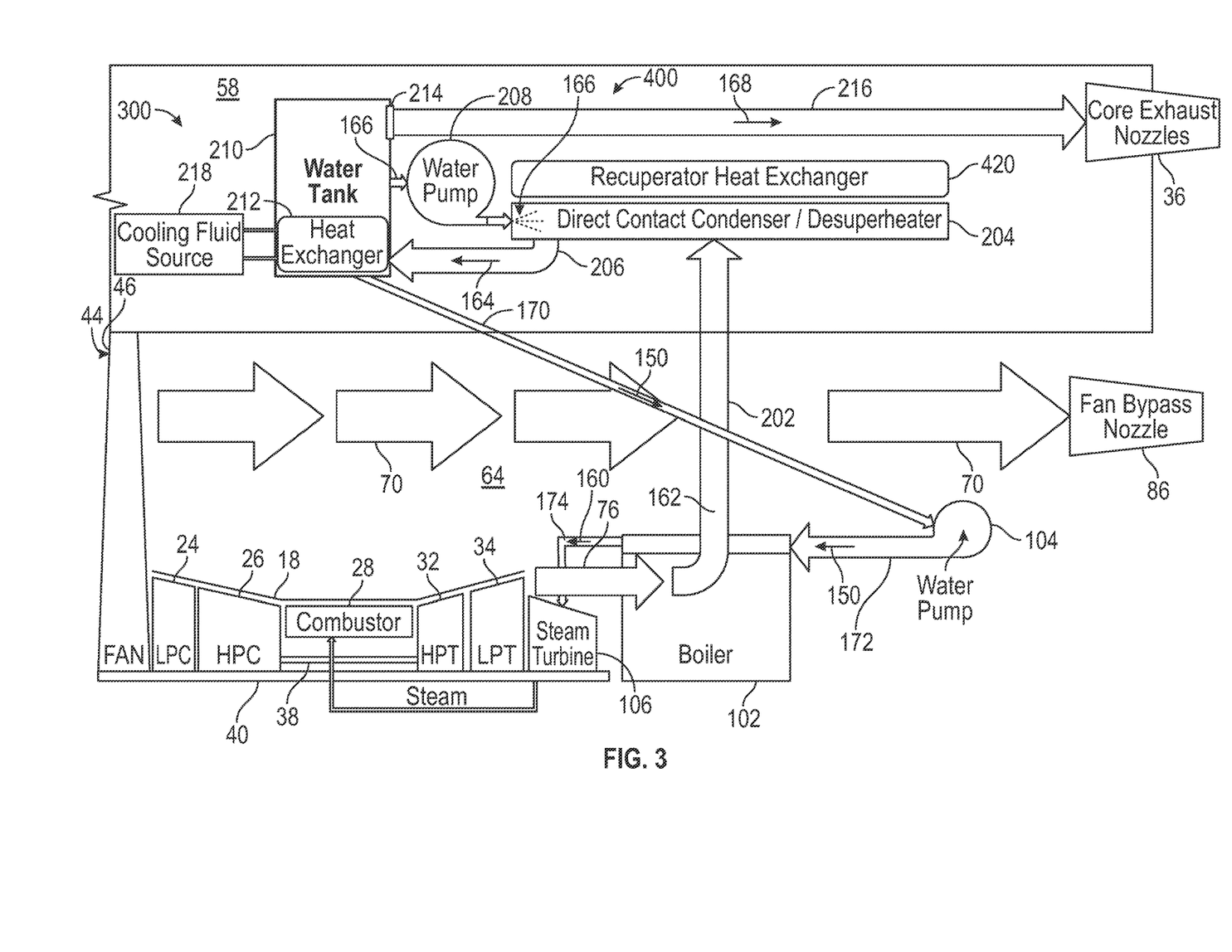
FIG. 3 is a schematic diagram of a turbine engine and a steam system, according to the present disclosure.

FIG. 3 illustrates a schematic diagram of a turbine engine and a steam system 300 having a condenser system 400, according to the present disclosure. For clarity, the turbine engine is shown schematically in FIG. 3 and some components are not shown in FIG. 3. The turbine engine, the steam system 300, and the condenser system 400 of FIG. 3 are substantially similar to the turbine engine 10, the steam system 100, and the condenser system 200, respectively, described with respect to FIG. 2, with the addition of a recuperator heat exchanger 420 in the condenser system 200, as described in more detail to follow. Accordingly, the same reference numerals will be used for components of the turbine engine, the steam system 300, and the condenser system 400 that are the same as or similar to the components of the turbine engine 10, the steam system 100, and the condenser system 200 discussed above. The description of these components above also applies to this embodiment, and a detailed description of these components is omitted here.

The recuperator heat exchanger 420 is located between the direct contact condenser 204, also referred to herein as a de-superheater, and the exhaust passage 216. During operation, as the exhaust-vapor flow 162 flows through the condenser 204, the recuperator heat exchanger extracts heat from the exhaust-vapor flow 162. This assists in the condensing of the exhaust-vapor flow 162 through the condenser 204. The heat extracted by the recuperator heat exchanger 420 is transferred to the air or the exhaust in the exhaust passage 216. This further heats the flow of exhaust 168 before being discharged through the core exhaust nozzle(s) 36.

Figure 4:
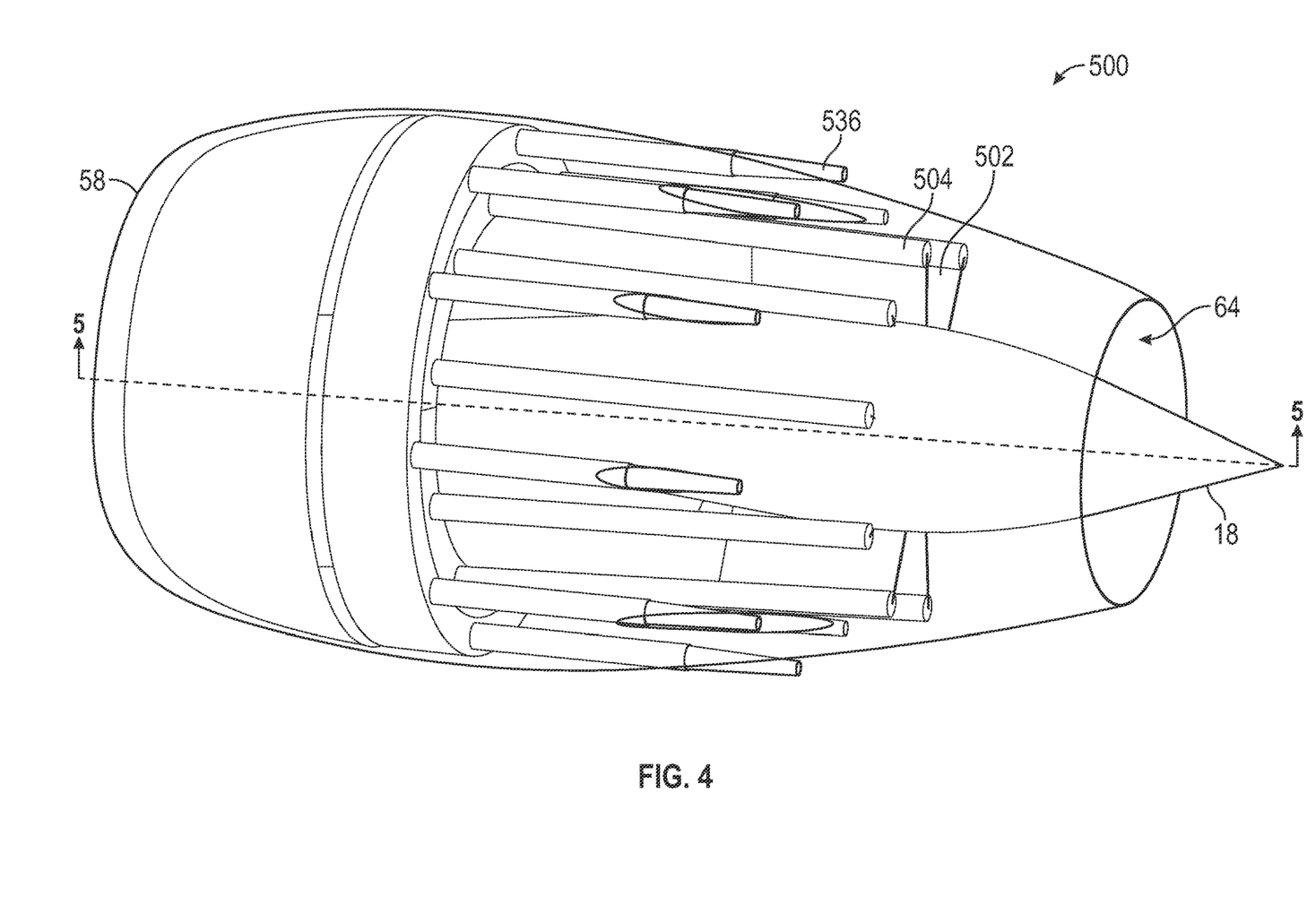
FIG. 4 illustrates a schematic view of a turbine engine including a direct contact condenser, according to the present disclosure.
Figure 5:
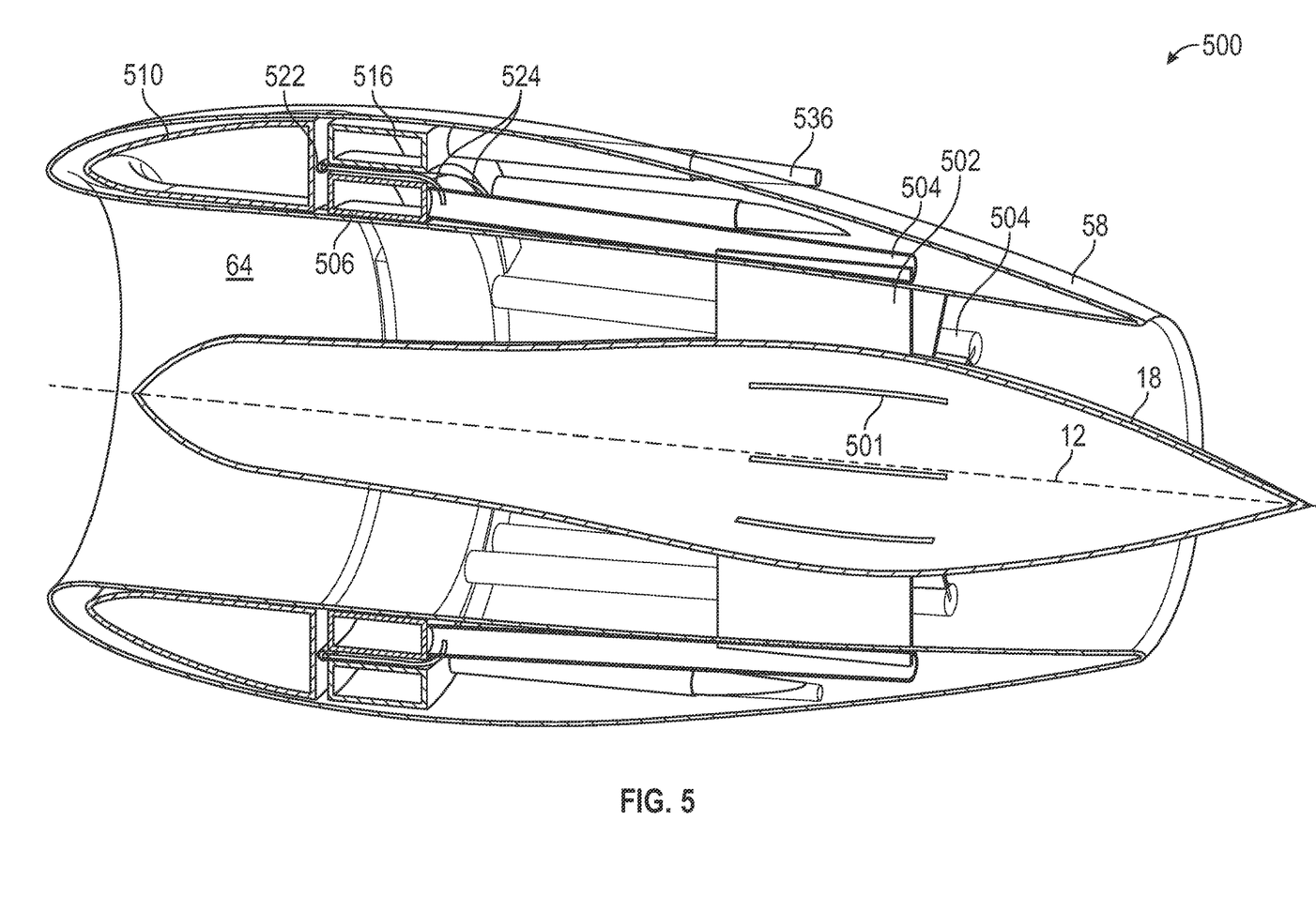
FIG. 5 illustrates a schematic cross-sectional view of the turbine engine of FIG. 4, taken along a longitudinal centerline axis of the turbine engine, according to the present disclosure.
Figure 6:
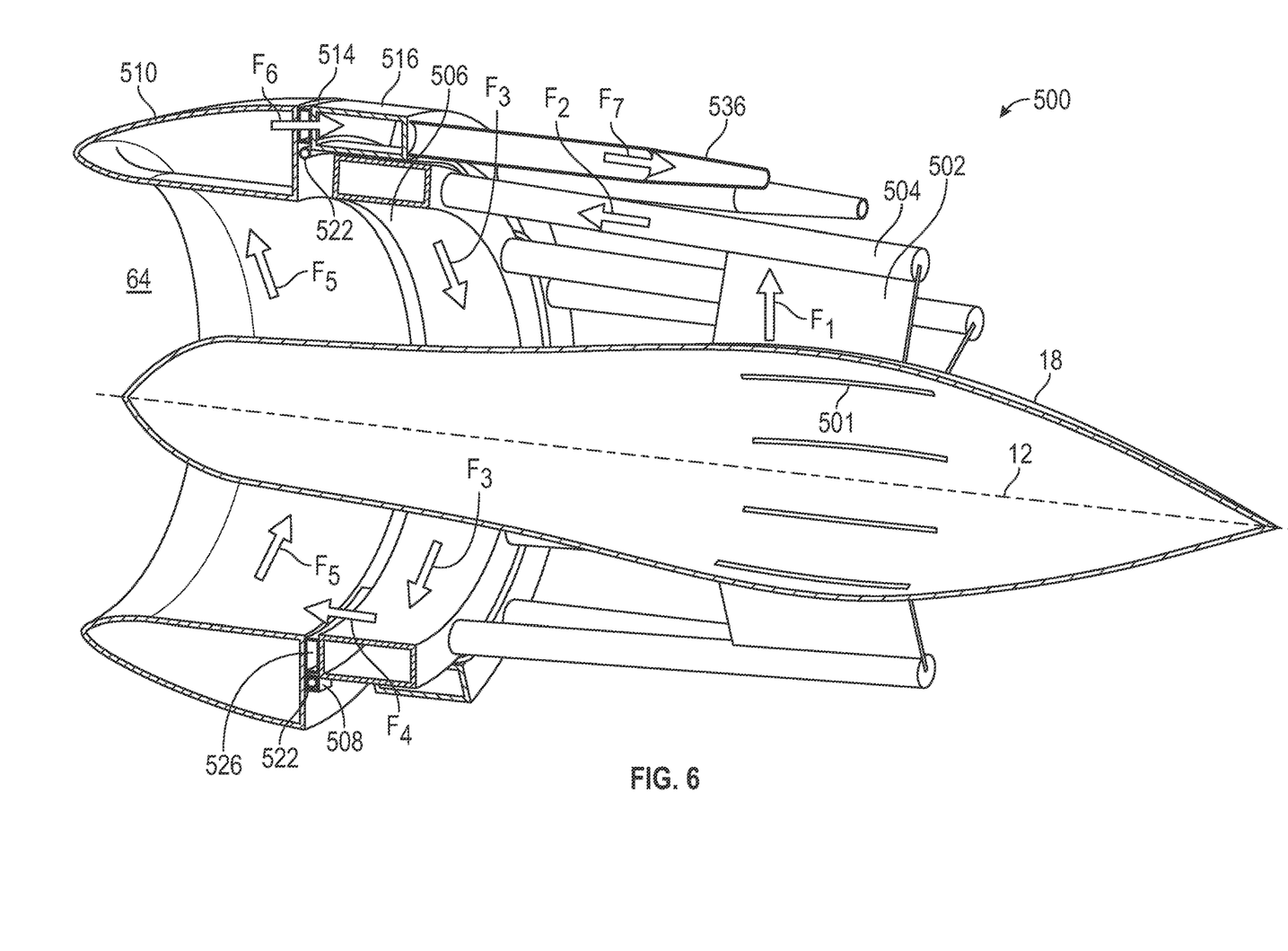
FIG. 6 illustrates a schematic cross-sectional view of the turbine engine of FIG. 4, with the core cowl omitted for clarity, taken along a longitudinal centerline axis of the turbine engine, according to the present disclosure.

FIGS. 4 to 6 illustrate an exemplary condenser system 500 that may be employed as the condenser system 200 (FIG. 2) or the condenser system 400 (FIG. 3). FIG. 4 illustrates a schematic view of the nacelle 58, with the nacelle 58 illustrated as being transparent to facilitate understanding of the components of the condenser system 500. FIG. 5 illustrates a cross-sectional view of the condenser system 500 taken at section line 5-5 of FIG. 4. The internal components of the outer casing 18 (e.g., the components of the turbo-engine 16 described with respect to FIG. 1) are omitted for clarity. FIG. 6 illustrates a cross-sectional view of the condenser system 500 taken through the section line 5-5 of FIG. 4 with the nacelle 58 and the internal components of the outer casing 18 omitted for clarity.

For reasons discussed to follow, the condenser system 500 of FIGS. 4 to 6 may be viewed with respect to a "clock" orientation having a twelve o'clock position, a three o'clock position, a six o'clock position, and a nine o'clock position, in the orientation of the condenser system 500 depicted in FIGS. 4 to 6. That is, the condenser system 500 has a twelve o'clock position at a location extending vertically and perpendicularly upwards with respect to the longitudinal centerline axis 12 in the view of FIG. 4. The twelve o'clock position is the vertically uppermost location of the condenser system 500 with respect to the ground surface based on the orientation of the turbine engine 10 (FIG. 1). The condenser system 500 has a six o'clock position at a location extending vertically and perpendicularly downwards with respect to the longitudinal centerline axis 12 in the view of FIG. 4. The six o'clock position is the vertically lowermost location of the condenser system 500 with respect to the ground surface based on the orientation of the turbine engine 10. The three o'clock position extends perpendicularly outward (from the page) with respect to the longitudinal centerline axis 12 and the nine o'clock position extends perpendicularly outward (into the page) with respect to the longitudinal centerline axis 12 in a direction opposite the three o'clock position (i.e., looking from an upstream to downstream). The clock orientation is understood to include all clock positions therebetween.

Referring to FIGS. 4 to 6, the condenser system 500 includes a plurality of openings 501, each opening 501 allowing entry of a flow into a corresponding exhaust-vapor passage 502 and a corresponding condenser 504. The exhaust-vapor passages 502 may be the exhaust-vapor passages 202 described with respect to FIGS. 2 and 3. The condensers 504 may be the condenser 204 described with respect to FIGS. 2 and 3.

The combustion gases 76 (FIG. 1) flow through the core air flow path 42 (FIG. 1) within the outer casing 18. The combustion gases 76 are a moist core exhaust air flow that flows through the openings 501 in the outer casing 18 and into the corresponding condenser 504 via the exhaust-vapor passage 502, as represented by flow $F_1$. The combustion gases 76 flow radially through the exhaust-vapor passages 502 after being cooled by an evaporator, such as the boiler 102. Some cooling occurs in the exhaust-vapor passages 502 as a de-superheater. Condensation generally does not occur, however, in the flow $F_1$. Some liquid may condense out, but such condensation is not required in the flow $F_1$. The cooling of the combustion gases within the exhaust-vapor passage 502 occurs by way of the flow of bypass air 70 (FIG. 1) flowing past the exhaust-vapor passages 502 within the bypass airflow passage 64. Since there is little to no condensation within the exhaust-vapor passages 502, the flow $F_1$ is directed radially outward to minimize pressure losses without concern of liquid condensate draining by gravity.

In the exemplary condenser system 500, the exhaust-vapor passages 502 are struts extending between the outer casing 18 and a corresponding condenser 504. The struts may support the condensers 504 within the nacelle 58. The exhaust-vapor passages 502 are sized to minimize pressure loss of the flow of combustion gases 76 (e.g., of the flow $F_1$)

and to minimize pressure loss of the flow of bypass air 70 (FIG. 1). As used herein, "minimize pressure loss" and "minimal pressure loss" are defined as ten percent or less of pressure loss from an inlet of the exhaust-vapor passages 502 to an outlet of the exhaust-vapor passages 502. Although the cross section of the struts is not illustrated in FIGS. 4 to 6, the cross section may be understood to have one or more passages within the interior of the strut that operate as the exhaust-vapor passage 502. The shape of the exhaust-vapor passage 502 is not limited to the shape illustrated in FIGS. 4 to 6. In some examples, each strut may be a plurality of struts.

More or fewer openings 501, exhaust-vapor passages 502, and condensers 504, than are shown may be provided. In some examples, a single opening 501 leads to a single exhaust-vapor passage 502 and a single condenser 504 may be provided. In some examples, a plurality of openings 501 lead to a plurality of exhaust-vapor passages 502, which lead to a single, annular or a semi-annular condenser 504. Any combination of singular and a plurality of openings, passages, and condensers may be provided.

From the exhaust-vapor passages 502, the core exhaust (e.g., the combustion gases 76) flows through the condensers 504, as represented by the flow $F_2$. Water (e.g., liquid water 166 (FIG. 2)) is injected into the condensers 504 as finely atomized droplets to act as condensation nuclei for the existing water vapor in the flow $F_2$, which results in growing liquid water droplets. The growing liquid water droplets are transported pneumatically (e.g., as an aerosol) to a supply manifold 506. The supply manifold 506 may be the exhaust-condensate passage 206 described with respect to FIGS. 2 and 3. The supply manifold 506 of FIG. 5 is an annular, liquid supply manifold. In some examples, between ten percent and one hundred percent of the liquid has condensed by the time the flow exits the condensers 504. In some examples, between twenty percent and one hundred percent of the liquid has condensed by the time the flow exits the condensers 504. In some examples, between thirty percent and one hundred percent of the liquid has condensed by the time the flow exits the condensers 504. In some examples, there is not complete condensation of the flow within the condensers 504, and further condensation occurs downstream of the condensers 504 as described in more detail to follow.

The water (e.g., liquid water 166) is injected into the condenser 504 from a liquid manifold 522 through a liquid spray nozzle 524. A second water pump 508, which may be the second water pump 208 of FIG. 2, pumps the water from the liquid manifold 522 through the liquid spray nozzle 524 and into the condensers 504. In some examples, the liquid manifold 522 may be omitted and the water may be pumped directly from a water tank 510 (or the water tank 210 (FIG. 2)) to the condensers 504. Each condenser 504 of the plurality of condensers 504 may include a corresponding liquid spray nozzle 524.

The flow $F_2$ is now condensed and enters the supply manifold 506 as an exhaust-condensate mixture, represented as a flow $F_3$. The flow $F_3$ flows circumferentially towards an engine six o'clock position (e.g., toward the second water pump 508) to encourage droplets and liquid film in the exhaust-liquid mixture to drain to a common collection point. In the example of FIGS. 4 to 6, the common collection point is the area around the second water pump 508.

The flow of the fluid toward the six o'clock position drives air, steam, and entrained liquid (droplets and film) into the water tank 510, as represented by flow $F_4$. The water tank 510 may be the water tank 210 of FIG. 2. In some examples, a fluid flow device 526 is provided between the supply manifold 506 and the water tank 510. The fluid flow device 526 may be a sparger that distributes the air and the steam in the flow $F_4$ as small, low velocity bubbles to maximize contact surface area with the existing liquid water pool as the flow $F_4$ flows into the water tank 510. The fluid flow device 526 may also be a direct contact condenser that directly contacts the liquid flow of water with residual steam in the flow sparged therethrough. By forcing the bubbles of steam through the liquid water, the steam is further condensed into liquid.

Within the water tank 510, the exhaust separates with water collecting near the six o'clock position, residual steam condensing through direct contact condensation in a submerged jet mode, and non-condensable air migrates towards the top of the water tank 510 (as represented by the flow $F_5$). The water and the condensing steam collecting near the six o'clock position of the water tank 510 may be fed to the boiler 102 (FIG. 2) (via the first water pump 104 of FIG. 2), fed to the condenser 504 (or the condenser 204), via the second water pump 508 (or the second water pump 208), or fed to both the boiler 102 and the condenser 504.

The water tank 510 is a plenum or a cavity that serves as a stored water tank, for example, when the demand for cycle water injection in the condenser system 500 is greater than the condensation rate of the condenser system 500. In such cases, the condenser system 500 may be considered not self-sustaining.

At the twelve o'clock position, the flow comprises non-condensable air and may comprise residual liquid. As the fluid flows, as represented by flow $F_6$, from the water tank to an exhaust passage 516, the flow $F_6$ may pass through one or more fluid flow devices 514 that further remove any remaining entrained liquid drops. The fluid flow device 514 filters residual liquid water drops entrained in the air prior to discharge to a return manifold, e.g., the exhaust passage 516. The exhaust passage 516 may be the exhaust passage 216 of FIG. 2. The fluid flow device 514 may be a dryer, such as dryer 214 of FIG. 2, a filter, a mist pad, a wave-plate separator, or other fluid flow device that functions to remove and to drain liquid droplets from the flow $F_6$. Water separated out of the flow $F_6$ may flow toward the six o'clock position of the exhaust passage 516.

The exhaust passage 516 distributes dried air, as represented by the flow $F_7$, to a plurality of discharge nozzles, also referred to as a plurality of core exhaust nozzles 536, which may be the core exhaust nozzle(s) 36 of FIG. 1. The core exhaust nozzle(s) 36 accelerate dried air through the core exhaust nozzle(s) 36 for thrust generation.

As illustrated in FIGS. 4 to 6, the plurality of core exhaust nozzles 536 are in recuperative heat exchange with the condensers 504 to heat the exhaust (e.g., flow $F_7$) while simultaneously cooling (i.e., de-superheating) the warm moist stream (e.g., flow $F_2$). In some examples, such as illustrated in FIG. 3, an additional recuperator heat exchanger 420 is provided between the condenser 204 or condenser 504 and the exhaust passage 216 or the exhaust passage 516. Although not illustrated in FIGS. 4 to 6, a heat exchanger, such as heat exchanger 212 of FIG. 2, may be provided in the water tank 510.

Stated another way, the condenser system 500 may include a plurality of radially oriented struts (e.g., exhaust-vapor passages 502) for conveying the engine exhaust after the evaporator (e.g., boiler 102) from the core exhaust plane across the fan bypass duct to the nacelle 58. The struts may pre-cool and de-superheat the moist air. A plurality of fluid passages, such as condensers 504, convey the moist air to a first manifold (e.g., the supply manifold 506). At least one liquid spray nozzle (e.g., liquid spray nozzle 524) may be located at a distal end of the fluid passage for injecting atomized liquid droplets into the condenser. As illustrated in FIGS. 4 to 6, the condensers 504 may be elongated tubular passages. The first manifold or plenum (e.g., the supply manifold 506) collects the discharge flow from the plurality of fluid passages (e.g., condensers 504) and continues to condense and to separate liquid water from non-condensable components (e.g., air or, potentially, soot particles). A first fluid transfer device, such as sparger (e.g., fluid flow device 526), couples the first manifold to a second manifold or a plenum (e.g., the water tank 510). The first fluid transfer device may span only a lower portion of the gas turbine annulus (e.g., a portion from about 4 o'clock to about 8 o'clock of the annulus). The first fluid transfer device injects the condensing liquid air mixture into the accumulated water in the second manifold to further condense water vapor. A second fluid transfer device, such as fluid flow device 514, couples the second manifold to a third manifold or a plenum (e.g., the exhaust passage 516). The second fluid transfer device may be a liquid droplet collection device (mist pad, wave plate, filter) to capture residual liquid in the exhaust flow. A plurality of exhaust ducts, such as core exhaust nozzles 536, convey and accelerate the dried pressurized air from the third manifold to the ambient through the gas turbine engine cowl to generate thrust. A pump located near the bottom of the second plenum delivers water to the spray nozzles in the fluid passages (e.g., condensers 504).

As noted above, the condenser systems of the present disclosure may include one or more heat exchangers. For example, the condenser systems may include a heat exchanger in the water tank for keeping water injected into the direct contact condenser cool. The condenser systems may include a heat exchanger between the second water pump and the direct contact condenser passages to cool water prior to injection into the condensers. The condenser systems may include heat sinks in the water tank that may include ambient air through ram air or direct conduction through a nacelle, jet fuel, cryogenic fuel (liquid hydrogen), or fan duct air extracted from a bypass stream. The heat exchanger (e.g., heat exchanger 212) may include a thermal transport bus with an intermediate medium to transfer heat from the water tank to the heat sinks.

The condenser systems of the present disclosure may include one or more recuperative heat exchangers between the direct contact condenser passages and the dried air exhaust ducts, such that heat is transferred from a bulk air-steam mixture in the condenser, while heating the exhaust duct to increase the exhaust temperature to increase thrust.

As shown herein, any of the components of the steam system or the condenser system may include one component or a plurality of components. For example, as discussed, any of the condenser passages, the struts, or the exhaust nozzles may be fewer than the plurality shown.

Accordingly, the condenser system of the present disclosure provides condensation of a flow of combustion gases exiting a core flow path of a turbine engine. The condenser system comprises more than one passage or manifold in which condensation occurs. In the examples described herein, condensation occurs in the elongated passages (e.g., the condenser 204) and, when passing from the first plenum to the second plenum (e.g., with a sparger, such as the fluid flow device 526). In both instances, the condensation is contact condensation. In the elongated passages, the contact is the liquid spray contacting the exhaust-vapor flow. In the device between the first plenum and the second plenum, the contact is gas being sparged through a liquid flow.

Therefore, the condenser system of the present disclosure provides a first direct contact condenser (e.g., condenser 204, 504) that introduces liquid droplets (e.g., via the liquid spray nozzles 524) into a first flow (e.g., exhaust-vapor flow 162 or flow $F_2$) to condense steam in the first flow and to generate a second flow (e.g., exhaust-condensate flow 164 or flow $F_3$) and a second direct contact condenser (e.g., fluid flow device 526) for introducing steam bubbles (that are already present in the flow) into the second flow to condense the steam bubbles and to generate a third flow (e.g., the exhaust 168 or flow $F_5$).

Further aspects are provided by the subject matter of the following clauses.

A gas turbine engine for an aircraft comprises a fan and a turbo-engine comprising a combustor that combusts compressed air and fuel to generate combustion gases and a power turbine coupled to a shaft for driving the fan. The gas turbine engine comprises a direct contact condenser for condensing steam in a first flow into liquid water droplets and to generate a second flow including the liquid water droplets, a water tank for collecting the liquid water droplets of the second flow, and a water pump for introducing the liquid water droplets from the water tank into the direct contact condenser to act as condensation nuclei for the steam in the first flow. The first flow is an exhaust-vapor flow extracted from the combustion gases and the second flow is an exhaust-condensate flow from the direct contact condenser.

The gas turbine engine of the preceding clause, further comprising one or more liquid spray nozzles for introducing the liquid water droplets into the first flow, wherein the one or more liquid spray nozzles extend within the direct contact condenser.

The gas turbine engine of any preceding clause, further comprising a boiler and a steam turbine coupled to the shaft, wherein the boiler produces steam from the second flow and the steam is provided to the steam turbine for driving the shaft.

The gas turbine engine of any preceding clause, further comprising a recuperator heat exchanger aligned with the direct contact condenser, the recuperator heat exchanger removing heat from the first flow.

The gas turbine engine of any preceding clause, further comprising a nacelle circumferentially surrounding the fan, wherein the direct contact condenser, the water tank, and the water pump are located within the nacelle.

The gas turbine engine of any preceding clause, further comprising an outer casing enclosing the turbo-engine, a bypass airflow passage defined between the outer casing and the nacelle, and one or more struts extending into the bypass airflow passage downstream of fan, the one or more struts providing a passage for flow of the combustion gases to the direct contact condenser.

The gas turbine engine of any preceding clause 1, wherein the water tank is a gravity separator for separating liquid water from dehumidified combustion gases in the second flow.

The gas turbine engine of any preceding clause, wherein the water pump is a first water pump, the gas turbine engine comprising a second pump, wherein the second pump introduces the liquid water to a boiler.

The gas turbine engine of any preceding clause, wherein the combustion gases flow through the boiler, the combustion gases transferring heat to the liquid water to vaporize the liquid water to generate steam, and wherein the steam is provided to a steam turbine to drive the shaft.

The gas turbine engine of any preceding clause, wherein the direct contact condenser is a first direct contact condenser, the gas turbine engine comprising a second direct contact condenser for introducing water vapor bubbles into the second flow to further condense the water vapor bubbles and to generate a third flow.

The gas turbine engine of any preceding clause, further comprising a plenum for receiving the second flow from the first direct contact condenser, the plenum providing the second flow to the water tank for providing the second flow to the second direct contact condenser.

The gas turbine engine of any preceding clause, wherein the water tank is a first plenum, the gas turbine engine further comprising a second plenum for receiving the third flow from the second direct contact condenser.

The gas turbine engine of any preceding clause, wherein the second direct contact condenser is a sparger located between the first plenum and the second plenum.

The gas turbine engine of any preceding clause, further comprising a heat exchanger within the second plenum, the heat exchanger cooling the third flow.

The gas turbine engine of any preceding clause, wherein the first plenum is a gravity separator such that liquid water from the second flow is separated toward a six o'clock position of the first plenum to generate a water source and such that air and steam from the second flow is separated toward a twelve o'clock position of the first plenum to generate the third flow.

The gas turbine engine of any preceding clause, further comprising a third plenum for receiving the third flow.

The gas turbine engine of any preceding clause, further comprising a fluid flow device for removing liquid from the third flow to reduce a residual water present in the third flow, the third flow then being provided to an exhaust passage to be discharged from a plurality of core exhaust nozzles.

The gas turbine engine of any preceding clause, wherein the fluid flow device is as a dryer, a filter, a mist pad, a wave-plate separator, or combinations thereof.

The gas turbine engine of any preceding clause, further comprising a recuperator heat exchanger located between the first direct contact condenser and the exhaust passage, the recuperator heat exchanger removing heat from the first flow and providing heat to the third flow.

The turbine engine of the preceding clause further comprising a steam system having a steam turbine, the steam system providing a flow of steam to the steam turbine to rotate a shaft or a turbine of the turbine engine.

The turbine engine of any preceding clause, further comprising a nacelle, the condenser system located within the nacelle.

The turbine engine of any preceding clause, further comprising a plurality of openings in a housing of the turbo-engine, the plurality of openings permitting the first flow to enter the first direct contact condenser.

A condenser system for a turbine engine comprising a direct contact condenser for condensing steam in a first flow into liquid water droplets and to generate a second flow including the liquid water droplets, a water tank for collecting the liquid water droplets of the second flow, and a water pump for introducing the liquid water droplets from the water tank into the direct contact condenser to act as condensation nuclei for the steam in the first flow, the first flow being an exhaust-vapor flow from the turbine engine and the second flow is an exhaust-condensate flow from the direct contact condenser.

The condenser system of the preceding clause, further comprising an exhaust-vapor passage for providing the first flow from the turbine engine to the direct contact condenser.

The condenser system of any preceding clause, further comprising a recuperator heat exchanger aligned with the direct contact condenser, the recuperator heat exchanger removing heat from the first flow.

The condenser system of any preceding clause, further comprising one or more liquid spray nozzles for introducing the liquid water droplets into the first flow.

The condenser system of any preceding clause, the direct contact condenser being a first direct contact condenser, the condenser system comprising a second direct contact condenser for introducing water vapor bubbles into the second flow to further condense the water vapor bubbles and to generate a third flow.

The condenser system of any preceding clause, further comprising a plenum for receiving the second flow from the first direct contact condenser, the plenum providing the second flow to the water tank for providing the second flow to the second direct contact condenser.

The condenser system of any preceding clause, the water tank being a first plenum, the condenser system further comprising a second plenum for receiving the third flow from the second direct contact condenser.

The condenser system of any preceding clause, the second direct contact condenser being a sparger located between the first plenum and the second plenum.

The condenser system of any preceding clause, further comprising a heat exchanger within the second plenum, the heat exchanger cooling the third flow.

The condenser system of any preceding clause, the first plenum being a gravity separator such that liquid water from the second flow is separated toward a six o'clock position of the first plenum to generate a water source and such that air and steam from the second flow is separated toward a twelve o'clock position of the first plenum to generate the third flow.

The condenser system of any preceding clause, further comprising a third plenum for receiving the third flow.

The condenser system of any preceding clause, further comprising a fluid flow device for removing liquid from the third flow to generate a dried third flow, the dried third flow provided to an exhaust passage to be discharged from a plurality of core exhaust nozzles.

The condenser system of any preceding clause, the fluid flow device being as a dryer, a filter, a mist pad, a wave-plate separator, or combinations thereof.

The condenser system of any preceding clause, further comprising a recuperator heat exchanger located between the first direct contact condenser and the exhaust passage, the recuperator heat exchanger removing heat from the first flow and providing heat to the dried third flow.

The condenser system of any preceding clause, the first flow exhibiting a pressure loss of ten percent or less from an inlet of the exhaust-vapor passage to an outlet of the exhaust-vapor passage.

The condenser system of any preceding clause, the exhaust-vapor passage comprising a plurality of struts extending between a turbo-engine housing of the turbine engine and the first direct contact condenser.

The condenser system of any preceding clause, the first direct contact condenser being a plurality of elongated passages.

The condenser system of the preceding clause, further comprising a plenum for receiving the second flow from the first direct contact condenser, the plurality of elongated passages being in fluid communication with the plenum.

The condenser system of any preceding clause, the plurality of elongated passages extending circumferentially around a longitudinal centerline axis of the turbine engine.

The condenser system of any preceding clause, further comprising one or more liquid spray nozzles at a distal end of the first direct contact condenser.

The condenser system of any preceding clause, further comprising a pump for causing water from the water source to flow to the liquid spray nozzles.

The condenser system of any preceding clause, the third plenum being an annular cavity extending circumferentially around a longitudinal centerline axis of the turbine engine.

The condenser system of any preceding clause, the first plenum and the second plenum being annular cavities extending circumferentially around a longitudinal centerline axis of the turbine engine.

The condenser system of any preceding clause, the second direct contact condenser being located between a four o'clock position and an eight o'clock position of the turbine engine.

A turbine engine comprising the condenser system of any preceding clause.

A method of operating the turbine engine of any preceding clause.

A method of condensing combustion gases of a turbine engine with the condenser system of any preceding clause.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A gas turbine engine for an aircraft, the gas turbine engine comprising:
   a fan;
   a turbo-engine comprising:
     a combustor that combusts compressed air and fuel to generate combustion gases; and
     a power turbine coupled to a shaft for driving the fan;
   an exhaust-vapor passage that extracts an exhaust-vapor flow from the combustion gases of the turbo-engine;
   a direct contact condenser for receiving the exhaust-vapor flow from the exhaust-vapor passage, condensing steam in the exhaust-vapor flow into liquid water droplets, and generating a condensed flow that includes the liquid water droplets;
   a water tank for collecting the liquid water droplets of the condensed flow;
   a water pump for introducing the liquid water droplets from the water tank into the direct contact condenser to act as condensation nuclei for the steam in the exhaust-vapor flow in order to generate the condensed flow that includes the liquid water droplets; and
   a boiler that produces steam from the condensed flow and provides the steam to the turbo-engine.

2. The gas turbine engine of claim 1, further comprising one or more liquid spray nozzles for introducing the liquid water droplets into the exhaust-vapor flow, wherein the one or more liquid spray nozzles extend within the direct contact condenser.

3. The gas turbine engine of claim 1, further comprising a steam turbine coupled to the shaft, wherein the steam produced from the condensed flow is provided to the steam turbine for driving the shaft.

4. The gas turbine engine of claim 1, further comprising a recuperator heat exchanger aligned with the direct contact condenser, the recuperator heat exchanger removing heat from the exhaust-vapor flow.

5. The gas turbine engine of claim 1, further comprising a nacelle circumferentially surrounding the fan, wherein the direct contact condenser, the water tank, and the water pump are located within the nacelle.

6. The gas turbine engine of claim 5, further comprising:
   an outer casing enclosing the turbo-engine;
   a bypass airflow passage defined between the outer casing and the nacelle; and
   one or more struts extending into the bypass airflow passage downstream of fan, the one or more struts providing at least a section of the exhaust-vapor passage that directs the exhaust-vapor flow to the direct contact condenser.

7. The gas turbine engine of claim 1, wherein the water tank is a gravity separator for separating liquid water from the combustion gases in the condensed flow.

8. The gas turbine engine of claim 7, wherein the water pump is a first water pump, the gas turbine engine comprising a second pump, wherein the second pump introduces the liquid water to the boiler.

9. The gas turbine engine of claim 8, wherein the exhaust-vapor passage directs the exhaust-vapor flow through the boiler, the exhaust-vapor flow transferring heat to the liquid water to vaporize the liquid water to generate steam, and wherein the steam is provided to a steam turbine to drive the shaft.

10. The gas turbine engine of claim 1, wherein the direct contact condenser is a first direct contact condenser, the gas turbine engine comprising a second direct contact condenser for introducing water vapor bubbles into the condensed flow to further condense the water vapor bubbles and to generate a second direct contact condenser flow.

11. The gas turbine engine of claim 10, further comprising a plenum for receiving the condensed flow from the first direct contact condenser, the plenum providing the condensed flow to the water tank for providing the condensed flow to the second direct contact condenser.

12. The gas turbine engine of claim 10, wherein the water tank is a first plenum, the gas turbine engine further comprising a second plenum for receiving the second direct contact condenser flow from the second direct contact condenser.

13. The gas turbine engine of claim 12, wherein the second direct contact condenser is a sparger located between the first plenum and the second plenum.

14. The gas turbine engine of claim 12, further comprising a heat exchanger within the second plenum, the heat exchanger cooling the second direct contact condenser flow.

15. The gas turbine engine of claim 14, wherein the first plenum is a gravity separator such that liquid water from the condensed flow is separated toward a six o'clock position of the first plenum to generate a water source and such that air and steam from the condensed flow is separated toward a twelve o'clock position of the first plenum to generate the third second direct contact condenser flow.

16. The gas turbine engine of claim 12, further comprising a third plenum for receiving the second direct contact condenser flow.

17. The gas turbine engine of claim 16, further comprising a fluid flow device for removing liquid from the second direct contact condenser flow to reduce a residual water present in the second direct contact condenser flow, the second direct contact condenser flow then being provided to an exhaust passage to be discharged from a plurality of core exhaust nozzles.

18. The gas turbine engine of claim 17, wherein the fluid flow device is as a dryer, a filter, a mist pad, a wave-plate separator, or combinations thereof.

19. The gas turbine engine of claim 18, further comprising a recuperator heat exchanger located between the first direct contact condenser and the exhaust passage, the recuperator heat exchanger removing heat from the exhaust-vapor flow and providing heat to the second direct contact condenser flow.

20. A condenser system for a turbine engine, the condenser system comprising:

an exhaust-vapor passage that extracts an exhaust-vapor flow from a turbine engine and directs the exhaust-vapor flow through a boiler, the exhaust-vapor flow including at least a portion of combustion gases from the turbine engine;

a direct contact condenser for receiving the exhaust-vapor flow from the exhaust-vapor passage, condensing steam in the exhaust-vapor flow into liquid water droplets, and generating a condensed flow that includes the liquid water droplets;

a water tank for collecting the liquid water droplets of the condensed flow; and a water pump for introducing the liquid water droplets from the water tank into the direct contact condenser to act as condensation nuclei for the steam in the exhaust-vapor flow in order to generate the condensed flow that includes the liquid water droplets, wherein the boiler produces steam from the condensed flow and provides the steam to the turbine engine.

\* \* \* \* \*